US012559054B2

(12) United States Patent
Blum

(10) Patent No.: US 12,559,054 B2
(45) Date of Patent: Feb. 24, 2026

(54) LOWER LEG RESTRAINT SYSTEM

(71) Applicant: Universal City Studios LLC, Universal City, CA (US)

(72) Inventor: Steven C. Blum, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 257 days.

(21) Appl. No.: 18/344,370

(22) Filed: Jun. 29, 2023

(65) Prior Publication Data

US 2024/0025366 A1     Jan. 25, 2024

Related U.S. Application Data

(60) Provisional application No. 63/391,152, filed on Jul. 21, 2022.

(51) Int. Cl.
| | |
|---|---|
| *B60R 21/055* | (2006.01) |
| *B60R 21/00* | (2006.01) |
| *B60R 21/02* | (2006.01) |

(52) U.S. Cl.
CPC .... *B60R 21/055* (2013.01); *B60R 2021/0097* (2013.01); *B60R 2021/0273* (2013.01)

(58) Field of Classification Search
CPC ........... B60N 2/995; B60R 2021/0097; B60R 21/055; B60R 2021/0273
USPC .............................................. 297/466, 423.37
See application file for complete search history.

(56) References Cited

U.S. PATENT DOCUMENTS

| | | | | |
|---|---|---|---|---|
| 4,280,731 A | * | 7/1981 | Pitts | A61G 5/10 |
| | | | | 297/487 |
| 4,988,300 A | | 1/1991 | Yamaguchi et al. | |

| | | | | |
|---|---|---|---|---|
| 5,884,563 A | | 3/1999 | Sheldon et al. | |
| 6,513,441 B1 | * | 2/2003 | Clerx | B60R 21/02 |
| | | | | 104/53 |
| 7,677,671 B2 | * | 3/2010 | Steininger | B60R 21/02 |
| | | | | 297/487 |
| 7,987,793 B2 | | 8/2011 | Blonk et al. | |
| 8,317,631 B2 | | 11/2012 | Rentz et al. | |
| 8,453,576 B2 | | 6/2013 | Roodenburg et al. | |

(Continued)

FOREIGN PATENT DOCUMENTS

| | | | | |
|---|---|---|---|---|
| WO | WO-2011048325 A1 | * | 4/2011 | .............. B60N 2/995 |

OTHER PUBLICATIONS

PCT/US2023/027549 International Search Report and Written Opinion mailed Oct. 20, 2023.

*Primary Examiner* — Milton Nelson, Jr.
(74) *Attorney, Agent, or Firm* — Fletcher Yoder P.C.

(57)     ABSTRACT

Systems and methods presented herein include an amusement park attraction having a guest restraint device configured to restrain a guest of the amusement park attraction. The amusement park attraction also includes a lower leg restraint system configured to restrain portions of one or more lower legs of the guest relative to the guest restraint device while the guest is restrained by the guest restraint device of the amusement park attraction. The lower leg restraint system may partially or fully surround the one or more lower legs of the guest. In addition, in certain embodiments, a control system is configured to actuate one or more actuators of the lower leg restraint system to cause one or more restraining features of the lower leg restraint system to restrain the portions of the one or more lower legs of the guest relative to the guest restraint device.

17 Claims, 6 Drawing Sheets

(56)          References Cited

U.S. PATENT DOCUMENTS

| | | | |
|---|---|---|---|
| 9,744,930 B2 | 8/2017 | Howard | |
| 9,827,503 B2 * | 11/2017 | Freeman | B60R 21/00 |
| 10,357,722 B2 | 7/2019 | White et al. | |
| 10,898,816 B2 * | 1/2021 | Vance | A63G 1/00 |
| 11,110,877 B2 * | 9/2021 | Caelen | A63G 7/00 |
| 11,345,309 B2 | 5/2022 | Bruno et al. | |
| 2002/0070599 A1 | 6/2002 | Berra | |
| 2018/0304162 A1 * | 10/2018 | Freedman | A63G 31/14 |

* cited by examiner

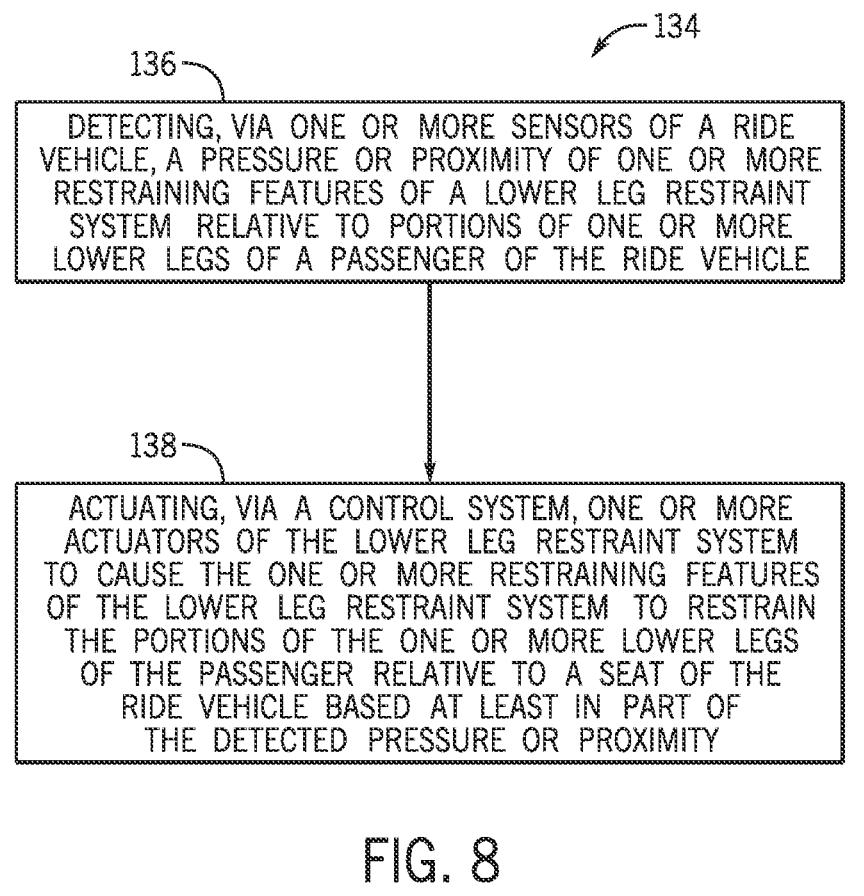

134

136

DETECTING, VIA ONE OR MORE SENSORS OF A RIDE
VEHICLE, A PRESSURE OR PROXIMITY OF ONE OR MORE
RESTRAINING FEATURES OF A LOWER LEG RESTRAINT
SYSTEM RELATIVE TO PORTIONS OF ONE OR MORE
LOWER LEGS OF A PASSENGER OF THE RIDE VEHICLE

138

ACTUATING, VIA A CONTROL SYSTEM, ONE OR MORE
ACTUATORS OF THE LOWER LEG RESTRAINT SYSTEM
TO CAUSE THE ONE OR MORE RESTRAINING FEATURES
OF THE LOWER LEG RESTRAINT SYSTEM TO RESTRAIN
THE PORTIONS OF THE ONE OR MORE LOWER LEGS
OF THE PASSENGER RELATIVE TO A SEAT OF THE
RIDE VEHICLE BASED AT LEAST IN PART OF
THE DETECTED PRESSURE OR PROXIMITY

FIG. 8

LOWER LEG RESTRAINT SYSTEM

CROSS-REFERENCE TO RELATED APPLICATION

This application claims priority to and the benefit of U.S. Provisional Application No. 63/391,152, entitled "RIDE VEHICLE LOWER LEG RESTRAINT SYSTEM," filed Jul. 21, 2022, which is hereby incorporated by reference in its entirety for all purposes.

BACKGROUND

The present disclosure relates generally to the field of amusement parks. More specifically, embodiments of the present disclosure relate to systems and methods for restraining lower leg portions of guests of amusement park attractions.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement park ride vehicles often include restraint systems configured to restrain upper body portions and/or waists of passengers of the ride vehicles. However, such ride vehicles generally do not include restraining features configured to restrain lower leg portions of the passengers while still allowing for the passengers to move their lower leg portions. It has been recognized that new systems for restraining lower leg portions of passengers would be beneficial.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In certain embodiments, an amusement park attraction includes a guest restraint device configured to restrain a guest of the amusement park attraction. The amusement park attraction also includes a lower leg restraint system configured to restrain portions of one or more lower legs of the guest relative to the guest restraint device while the guest is restrained by the guest restraint device of the amusement park attraction. The lower leg restraint system only partially surrounds the one or more lower legs of the guest.

In certain embodiments, an amusement park attraction includes a guest restraint device configured to restrain a guest of the amusement park attraction. The amusement park attraction also includes a lower leg restraint system configured to restrain portions of one or more lower legs of the guest relative to the guest restraint device while the guest is restrained by the guest restraint device of the amusement park attraction. In addition, the lower leg restraint system includes a front leg restraint sub-system that includes a padded front leg bar configured to be positioned closely proximate to and resist motion of the one or more lower legs of the guest when forces are applied against front portions of the one or more lower legs of the guest, and a back leg restraint sub-system that includes a padded back leg bar configured to be positioned closely proximate to and resist motion of the one or more lower legs of the guest when forces are applied against back portions of the one or more lower legs of the guest.

In certain embodiments, an amusement park attraction includes a guest restraint device configured to restrain a guest of the amusement park attraction. The amusement park attraction also includes a lower leg restraint system configured to restrain portions of one or more lower legs of the guest relative to the guest restraint device while the guest is restrained by the guest restraint device of the amusement park attraction. In addition, the lower leg restraint system includes one or more padded hooks configured to apply forces against front portions of the one or more lower legs of the guest.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 8 is a flow diagram of a method for utilizing a control system, in accordance with embodiments of the present disclosure.

DETAILED DESCRIPTION

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to systems and methods for restraining lower leg portions of guests of amusement park attractions (e.g., such as ride vehicles). For example, in certain embodiments, an amusement park ride vehicle may include a guest restraint device configured to restrain a passenger of the ride vehicle. The amusement park ride vehicle may also include a lower leg restraint system configured to restrain portions of one or more lower legs of the passenger relative to the guest restraint device while the passenger is restrained by the guest restraint device of the amusement park ride vehicle. The lower leg restraint system only partially surrounds the one or more lower legs of the passenger. In addition, in certain embodiments, a control system is configured to actuate one or more actuators of the lower leg restraint system to cause one or more restraining features of the lower leg restraint system to restrain the portions of the one or more lower legs of the passenger relative to the guest restraint device.

Figure 1:
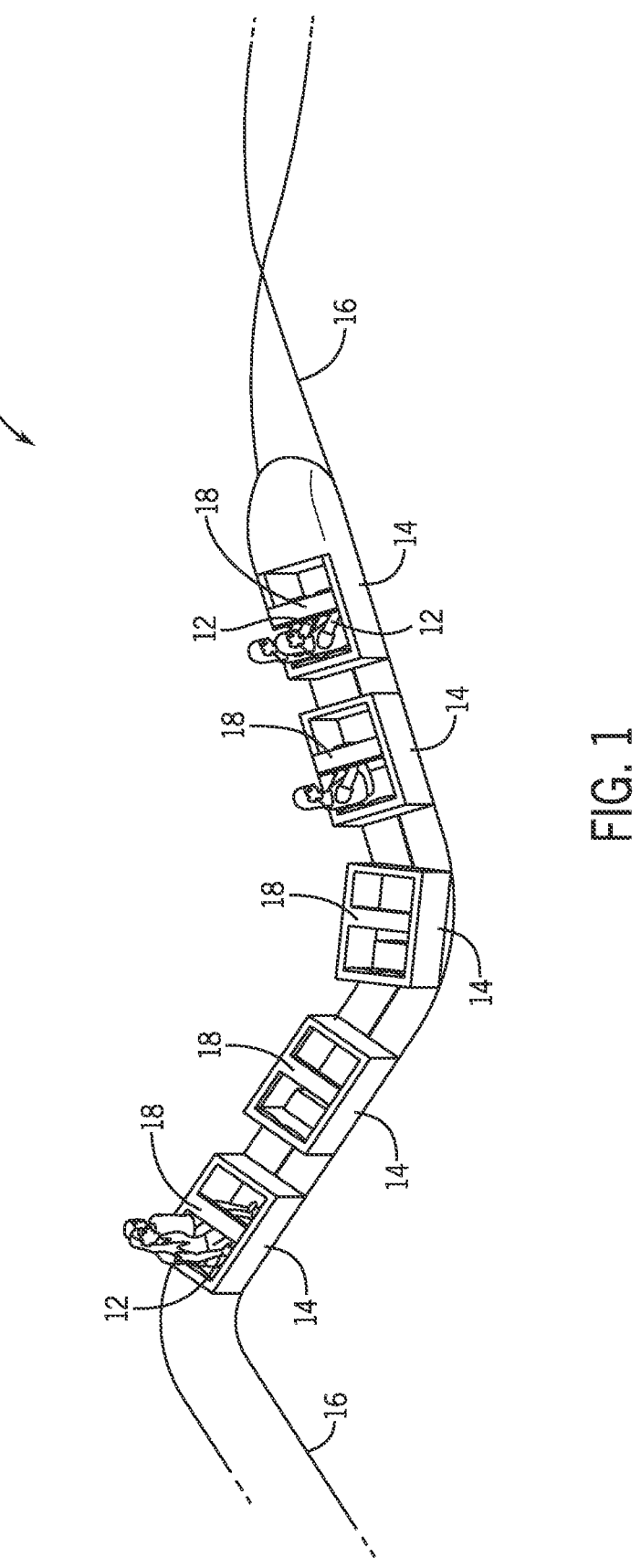
FIG. 1 depicts a side perspective view of an embodiment of a ride system, in accordance with embodiments of the present disclosure.

FIG. 1 depicts a side perspective view of an embodiment of a ride system 10 of an amusement park that includes a ride vehicle 14 (or other type of amusement park attraction, as described herein) that holds (or otherwise restrains) one or more passengers 12 (or other guests of the amusement park, as described herein). In certain embodiments, the ride vehicle 14 travels along a ride path 16. The ride path 16 may be any surface on which the ride vehicle 14 travels. In certain embodiments, the ride path 16 may be a track. The ride path 16 may or may not dictate the path traveled by the ride vehicle 14. That is, in certain embodiments, the ride path 16 may control the movement (e.g., direction, speed, and/or orientation) of the ride vehicle 14 as it progresses, similar to a train on train tracks. In other embodiments, there may be a system for controlling the path taken by the ride vehicle 14. For example, the ride path 16 may be an open surface that allows the passengers 12 to control certain aspects of the movement of the ride vehicle 14 via a control system resident on the ride vehicle 14. Alternatively or additionally, the control system may be resident on the open surface, such that the passenger 12 may control the open surface to maneuver the ride vehicle 14 at a target trajectory.

Furthermore, the ride system 10 may include ride vehicles 14 that may accommodate any number of ride passengers 12. For example, the illustrated embodiment shows five ride vehicles 14 that each accommodate two ride passengers 12. In other embodiments, the ride system 10 may include any number of ride vehicles 14. For example, the ride system 10 may include two, four, ten, twenty, or any number of ride vehicles 14, and each ride vehicle 14 may accommodate various ranges of passengers 12. For example, a first ride vehicle 14 may accommodate two passengers 12, a second ride vehicle 14 may accommodate four passengers 12, a third ride vehicle 14 may accommodate six passengers 12, and further ride vehicles 14 may accommodate any suitable numbers of passengers 12.

In certain embodiments, the ride vehicle 14 may include a restraint system 18, as described in greater detail herein. In certain embodiments, the restraint system 18 may be positioned above the lap of a passenger 12, such that the restraint system 18 applies a force on the lap of the passenger 12 to secure the passenger 12 to the ride vehicle 14. In certain embodiments, the restraint system 18 includes a torso harness that pulls over the shoulders of the passenger to secure their upper body relative to corresponding seating. In addition, as described in greater detail herein, the restraint system 18 may include a lower leg restraint system 20 to secure the feet, ankles, and lower legs (e.g., below the knees, otherwise referred to herein as calves) of the passenger relative to the corresponding seating. As used herein, the term "lower leg" may include the foot, ankle, calf, or any other portions of a leg of a passenger below the knee of the leg. In other words, the term "lower leg" as used herein may refer to any portion of a leg that is below the knee of the leg.

It should be noted that while the embodiments described herein are primarily directed towards ride vehicles 14 of ride systems 10 of amusement parks that include restraint systems 18 that are configured to restrain passengers 12 relative to the ride vehicles 14, in other embodiments, a restraint system 18 may be configured to restrain other guests of the amusement parks relative to other types of amusement park attractions of the amusement parks including, but not limited to, amusement park shows where the guests may be restrained relative to certain locations of the amusement park shows, amusement park experiences where guests may experience certain movements during the experiences that may not be characterized as "rides" per se, and so forth.

Figure 2:
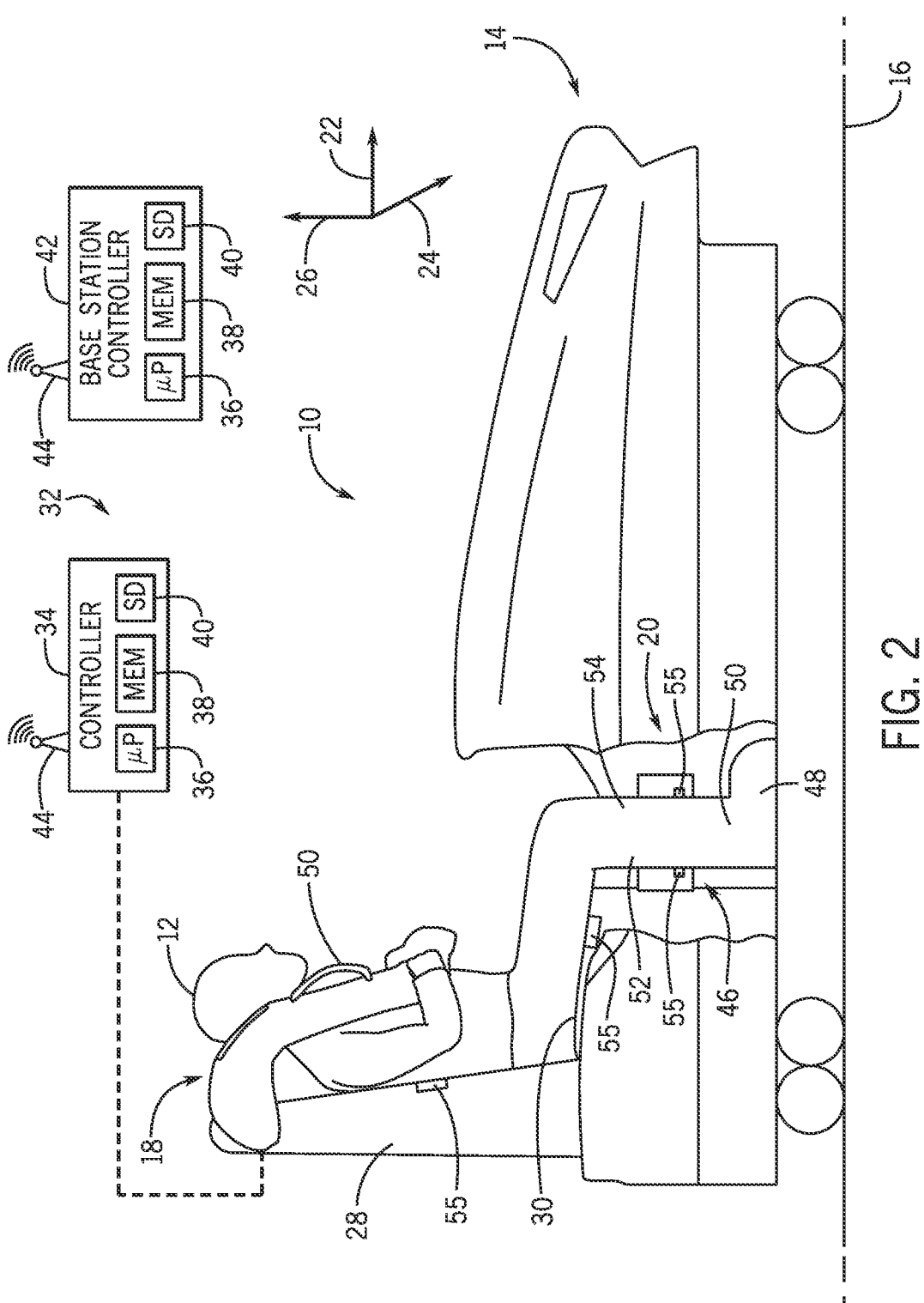
FIG. 2 depicts a cutaway side perspective view of an embodiment of a ride vehicle of the ride system of FIG. 1, in accordance with embodiments of the present disclosure.

FIG. 2 depicts a cutaway side perspective view of an embodiment of a ride vehicle 14 of the ride system 10 of FIG. 1. The passenger 12 may sit inside (or be otherwise restrained by) the ride vehicle 14 and be secured via the restraint system 18 (e.g., including the lower leg restraint system 20) while the ride vehicle 14 travels along the ride path 16 oriented substantially parallel with a longitudinal axis 22 (e.g., direction of travel). In certain embodiments, the restraint system 18 (e.g., including the lower leg restraint system 20) may apply forces on the passenger 12 along the longitudinal axis 22, a lateral axis 24, a vertical axis 26, or any combination thereof. For example, the restraint system 18 may apply forces that secure the torso of the passenger 12 to a seat 30 and a back rest 28 (or other type of guest restraint device, as described herein). For example, the passenger 12 may sit in (or be otherwise restrained by) the ride vehicle 14 such that the back of the passenger 12 is pressed up against the back rest 28 via the restraint system 18. In addition, as described in greater detail herein, the lower leg restraint system 20 may apply forces that secure the lower legs (e.g., feet, ankles, calves, and so forth) of the passenger 12 relative to the seat 30.

In certain embodiments, the ride system 10 includes a control system 32. In certain embodiments, the control system 32 includes one or more ride vehicle controllers 34. For example, in certain embodiments, each ride vehicle 14 may be associated with a respective ride vehicle controller 34. In certain embodiments, the ride vehicle controller(s) 34 may include a central controller that controls numerous ride vehicles 14. The ride vehicle controller(s) 34 may include a processor 36, a memory device 38, and a storage device 40.

It should be noted that the ride system 10 may also include a base station controller 42 that may facilitate the control of the control system 32. The base station controller 42 may also include a processor 36, a memory device 38, and storage device 40. In certain embodiments, the ride vehicle controller(s) 34 and the base station controller 42 may be communicatively coupled via respective transceivers 44 that enable wireless communication across any suitable protocol. In other embodiments, the base station controller 42 and the ride vehicle controller(s) 34 may be communicatively coupled via a wired (e.g., landline) connection. The ride vehicle controller(s) 34 and/or the base station controller 42 may serve as a quality check point, whereby the conditions of the ride system are monitored. For example, the base station controller 42 may receive data from the ride vehicle controller(s) 34, sensors on the ride vehicles 14, and so forth, to determine whether the restraint system 18 (e.g., including the lower leg restraint system 20) is in a locked configuration or unlocked configuration. Furthermore, an operator of the base station controller 42 may manually control the speed of the ride vehicle 14, the duration of a ride cycle of the ride vehicle 14, among other suitable aspects of the ride system 10.

The processor(s) 36 of one or both of the ride vehicle controller(s) 34 and the base station controller 42 may be used to execute software, such as software for locking and unlocking the restraint system 18 (e.g., including the lower leg restraint system 20). Furthermore, the processor(s) 36 may determine a start and end time associated with a ride cycle of the ride vehicle 14. The processor(s) 36 may include multiple microprocessors, one or more "general-purpose" microprocessors, one or more special-purpose microprocessors, and/or one or more application specific integrated circuits (ASICS), or some combination thereof. For example, the processor(s) 36 may include one or more reduced instruction set (RISC) processors.

The memory device(s) 38 may include volatile memory, such as random-access memory (RAM), and/or nonvolatile memory, such as read-only memory (ROM). The memory device(s) 38 may store a variety of information and may be used for various purposes. For example, the memory device(s) 38 may store processor-executable instructions (e.g., firmware or software) for the processor(s) 36 to execute, such as instructions for locking the restraint system 18 (e.g., including the lower leg restraint system 20), unlocking the restraint system 18 (e.g., including the lower leg restraint system and so forth.

In addition, the storage device(s) 40 (e.g., nonvolatile storage) may include read-only memory (ROM), flash memory, a hard drive, or any other suitable optical, magnetic, or solid-state storage medium, or a combination thereof. The storage device(s) 40 may store data (e.g., maintenance data, position data associated with the ride vehicle 14, and ride duration data), instructions (e.g., software or firmware for locking and unlocking the restraint system 18, including the lower leg restraint system 20, and otherwise operating the ride vehicle 14), and any other suitable information.

As illustrated in FIG. 2, the restraint system 18 may include the lower leg restraint system 20, whereby portions of lower legs 46 (e.g., feet 48, ankles 50, calves 52, shins 54, and so forth) of the passenger 12 may be held in place relative to the seat 30 of the ride vehicle 14, as described in greater detail herein. As described in greater detail herein, the control system 32 (e.g., the ride vehicle controller(s) 34 and/or the base station controller 42) may control the locking and unlocking of the lower leg restraint system 20 to lock and unlock the portions of the lower legs of the passenger 12 from being held in place relative to the seat 30 of the ride vehicle 14. In addition, as described in greater detail herein, the restraint system 18 may include one or more sensors 55 configured to detect the positioning of certain body portions of the passenger 12 relative to the seat 30 (and/or the back rest 28) of the ride vehicle 14, wherein the control system 32 uses data relating to the positioning of the certain body portions of the passenger 12 to properly lock/unlock the passenger 12 relative to the seat 30 (and/or the back rest 28) of the ride vehicle 14.

It should be noted that while the embodiments described herein are primarily directed towards restraint systems 18 that are configured to restrain passengers 12 relative to seats 30 (and/or back rests 28) of ride vehicles 14, in other embodiments, a restraint system 18 may be configured to restrain other guests to other type of guest restraint devices where the guest are standing, kneeling, in prone a position, and so forth, in addition to the seated ergonomic systems described herein.

Figure 3:
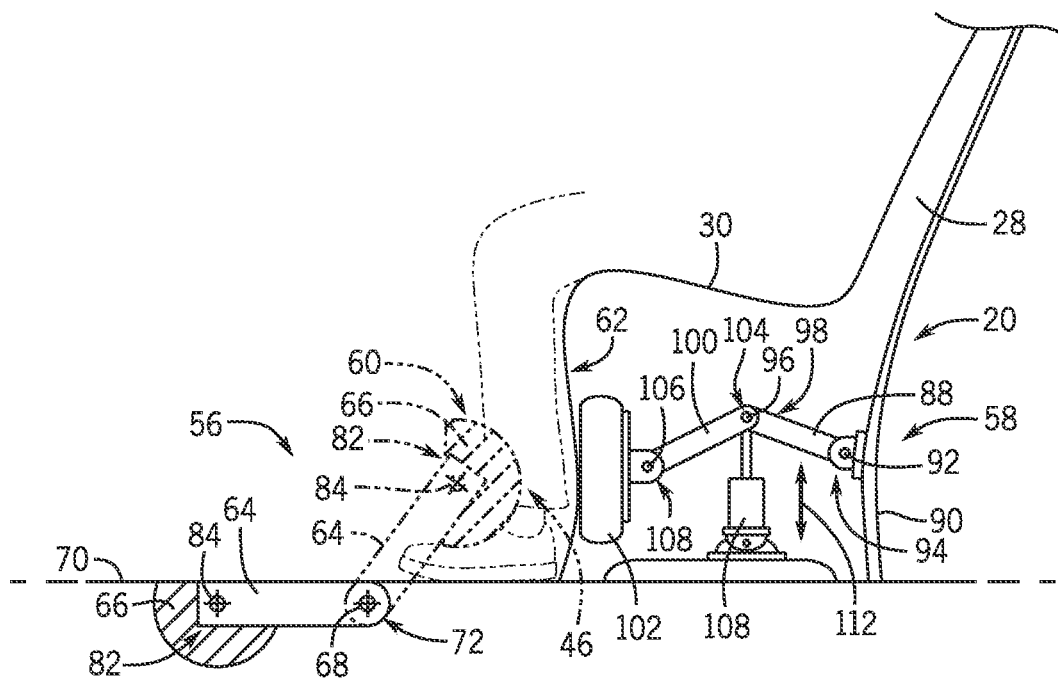
FIG. 3 is a side view of a seat and a lower leg restraint system of a ride vehicle of FIG. 2, in accordance with embodiments of the present disclosure.

FIG. 3 is a side view of the seat 30 and the lower leg restraint system 20 of the ride vehicle 14 of FIG. 2. As illustrated in FIG. 3, in certain embodiments, the lower leg restraint system 20 may include a front leg restraint sub-system 56 and a back leg restraint sub-system 58, whereby the front leg restraint sub-system 56 is configured to be positioned closely proximate to and resist motion of the lower legs 46 of the passenger 12 when forces are applied against front portions 60 (e.g., shins, and so forth) of the lower legs 46 of the passenger 12 and the back leg restraint sub-system 58 is configured to be positioned closely proximate to and resist motion of the lower legs 46 of the passenger 12 when forces are applied against back portions 62 (e.g., calves, heels, and so forth) of the lower legs 46 of the passenger 12 to hold the lower legs 46 in place relative to the seat 30 of the ride vehicle 14. As will be appreciated, the front and back leg restraint sub-systems 56, 58 do not completely surround the lower legs 46 of the passenger 12, thereby allowing lateral movement (e.g., side-to-side movement) of the lower legs 46 since they only partially surround the lower legs 46.

Figure 4:
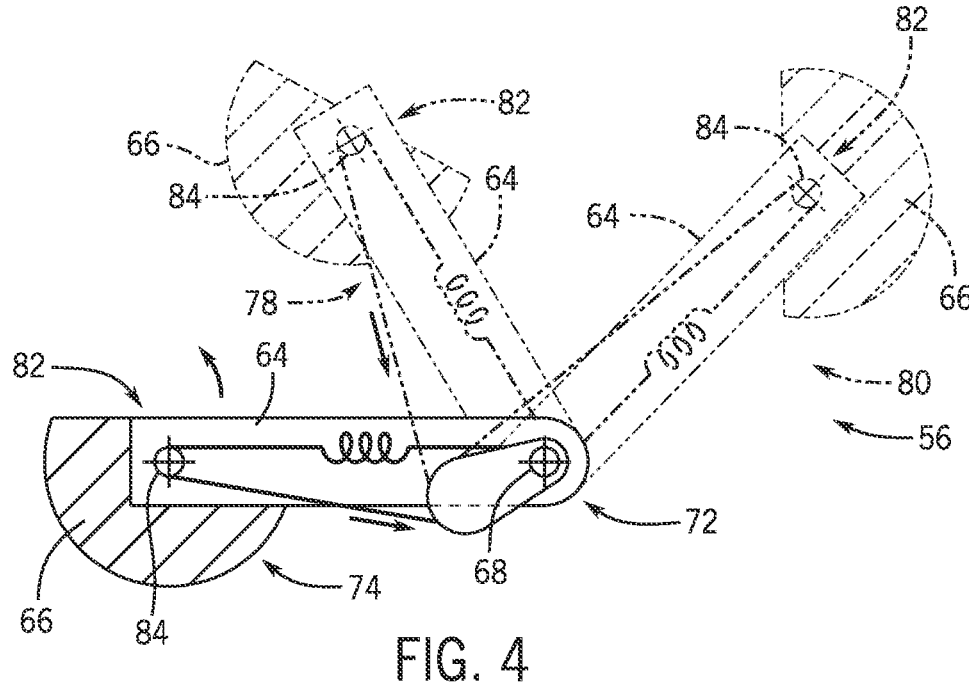
FIG. 4 is a side view of a front leg restraint sub-system of the lower leg restraint system of FIG. 3, in accordance with embodiments of the present disclosure.
Figure 5:
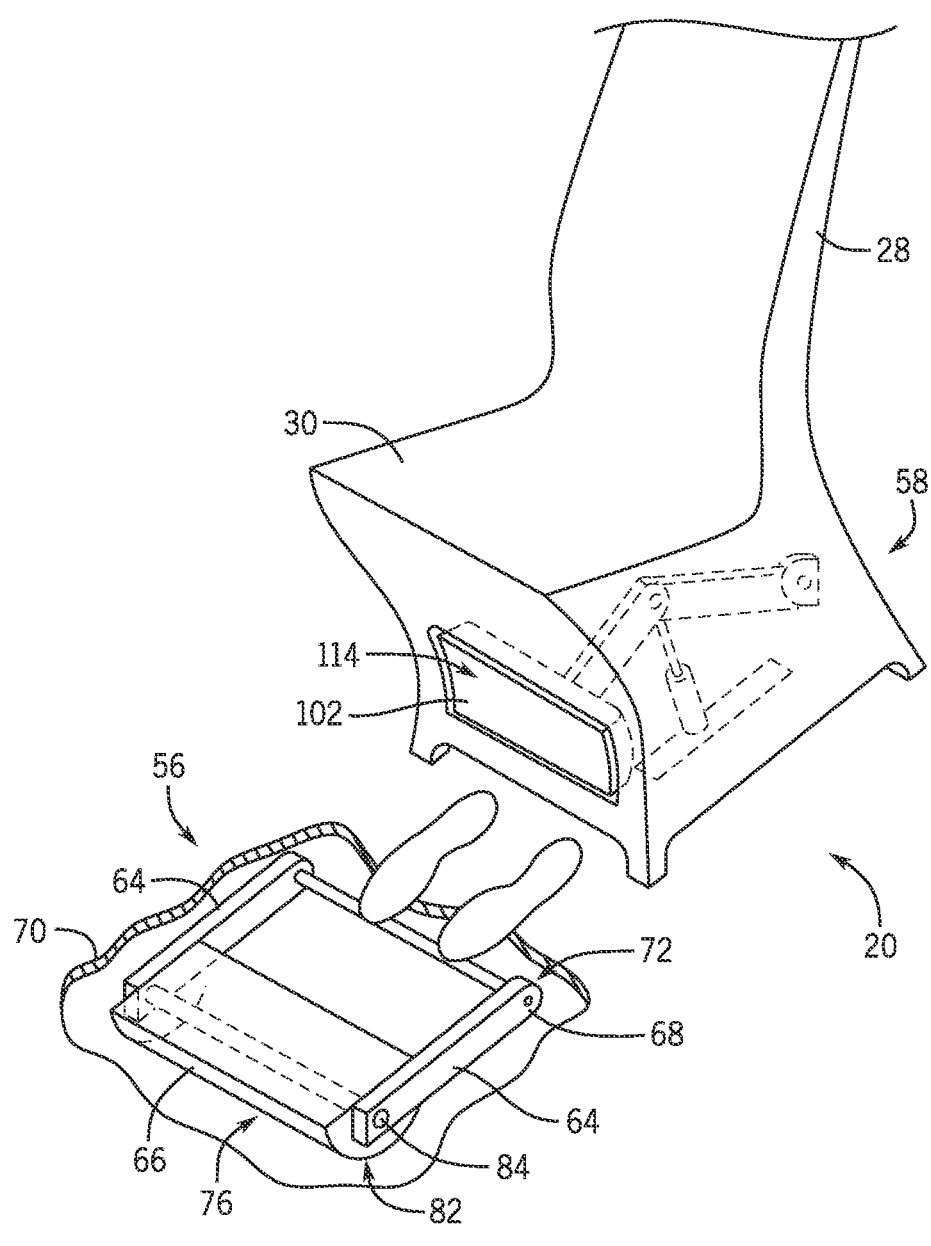
FIG. 5 is a perspective view of the seat and the lower leg restraint system of the ride vehicle of FIG. 3, in accordance with embodiments of the present disclosure.

FIG. 4 is a side view of the front leg restraint sub-system 56 of the lower leg restraint system 20 of FIG. 3. In addition, FIG. 5 is a perspective view of the seat 30 and the lower leg restraint system 20 of the ride vehicle 14 of FIG. 3. As illustrated in FIG. 5, in certain embodiments, the front leg restraint sub-system 56 may include one or more linkages 64 that are connected to a front leg bar 66 that is configured to be secured against front portions 60 of lower legs 46 of a passenger 12. Specifically, as illustrated, in certain embodiments, the one or more linkages 64 may be configured to pivot about a floor pivot joint 68 (e.g., within or near a floor 70 of the respective ride vehicle 14) at or near first axial ends 72 of the linkages 64. As illustrated in FIG. 4, in certain embodiments, the one or more linkages 64 may be configured to move the front leg bar 66 from a stowed position 74 (e.g., as also illustrated in FIG. 5), for example, where the front leg bar 66 is stowed within a storage chamber 76 built into the floor 70 of the respective ride vehicle 14, through intermediate positions 78, and to a restraining position 80 where the front leg bar 66 is secured against front portions 60 of lower legs 46 of a passenger 12. As illustrated in FIG. 4, in certain embodiments, one or more actuators 86 associated with the one or more linkages 64 may be configured to cause the one or more linkages 64 to move the front leg bar 66 between the various positions. In certain embodiments, the one or more actuators 86 may include cam-based mechanical actuators. However, in other embodiments, the one or more actuators 86 may include any suitable actuators capable of actuating the one or more associated linkages 64 such as other types of mechanical actuators, hydraulic actuators, pneumatic actuators, electric actuators, electromechanical actuators, electrohydraulic actuators, and other types of suitable actuators.

In addition, in certain embodiments, the one or more linkages 64 of the front leg restraint sub-system 56 may be coupled to the front leg bar 66 at or near second axial ends 82 (e.g., opposite the first axial ends 72) of the linkages 64. As described in greater detail herein, in certain embodiments, the front leg bar 66 may be configured to pivot about a bar pivot joint 84 formed at or near the second axial ends 82 of the linkages 64 such that the front leg bar 66 can be comfortably placed against front portions 60 of lower legs 46 of a passenger 12. As also described in greater detail herein, the front leg bar 66 may be padded to promote comfort and to prevent a hard surface from contacting the front portions 60 of the lower legs 46 of the passenger 12.

As illustrated in FIG. 3, in certain embodiments, the back leg restraint sub-system 58 may include a first linkage 88 that is coupled to a back seat wall 90 within the seat 30 of the ride vehicle 14. Specifically, as illustrated, in certain embodiments, the first linkage 88 may be configured to pivot about a wall pivot joint 92 at or near a first axial end 94 of the first linkage 88. In addition, in certain embodiments, the first linkage 88 may also be configured to pivot about a main pivot joint 96 of the back leg restraint sub-system 58 at or near a second axial end 98 (e.g., opposite the first axial end 94) of the first linkage 88.

As also illustrated in FIG. 3, in certain embodiments, the back leg restraint sub-system 58 may also include a second linkage 100 that is coupled to the first linkage 88 and to a back leg bar 102. Specifically, as illustrated, in certain embodiments, the second linkage 100 may be configured to pivot about the main pivot joint 96 at or near a first axial end 104 of the second linkage 100. In addition, in certain embodiments, the second linkage 100 may also be configured to pivot about a bar pivot joint 106 of the back leg restraint sub-system 58 at or near a second axial end 108 (e.g., opposite the first axial end 104) of the second linkage 100. In addition, the second linkage 100 may be coupled to a back leg bar 102 at the bar pivot joint 106.

In certain embodiments, the first and second linkages 88, 100 of the back leg restraint sub-system 58 may be configured to move the back leg bar 102 from a stowed position where the back leg bar 102 is stowed within a seat 30 of the respective ride vehicle 14 to a restraining position (as illustrated in FIGS. 3 and 5) where the back leg bar 102 is secured against back portions 62 of lower legs 46 of a passenger 12. Specifically, in certain embodiments, an actuator 110 (e.g., coupled to the floor 70 of the respective ride vehicle 14) may be configured to cause the main pivot joint 96 to move down (e.g., as illustrated by arrows 112) such that the first axial end 94 of the first linkage 88 (e.g., coupled to the back seat wall 90) and the second axial end 108 of the second linkage 100 move away from each other, thereby causing the back leg bar 102 to move against the back portions 62 of the lower legs 46 of the passenger 12 in the restraining position (as illustrated in FIGS. 3 and 5). Conversely, the actuator 110 may also be configured to cause the main pivot joint 96 to move up (e.g., as illustrated by arrows 112) such that the first axial end 94 of the first linkage 88 (e.g., coupled to the back seat wall 90) and the second axial end 108 of the second linkage 100 move toward each other, thereby causing the back leg bar 102 to move away from the back portions 62 of the lower legs 46 of the passenger 12 to stow the back leg bar 102 within the seat 30. In certain embodiments, the actuator 110 may be a piston-based hydraulic actuator. However, in other embodiments, the actuator 110 may be any suitable actuator capable of actuating the first and second linkages 88, 100 such as another type of hydraulic actuator, a mechanical actuator, a pneumatic actuator, an electric actuator, an electrohydraulic actuator, an electromechanical actuator, or other suitable actuator.

It should be noted that while illustrated in FIGS. 3-5 as having a particular number of linkages 64, 88, 100 and other articulating devices, in other embodiments, other numbers of linkages and/or other articulating devices may be used such that the front and back leg restraint sub-systems 56, 58 provide any number of degrees of freedom for the restraining features 66, 102 of the lower leg restraint system 20.

As illustrated in FIG. 5, in certain embodiments, the seat 30 may include a window 114 through which the back leg bar 102 may move when moving between the stowed position and the restraining position. Similar to the front leg bar 66 of the front leg restraint sub-system 56, in certain embodiments, the back leg bar 102 may be padded to promote comfort and to prevent a hard surface from contacting the back portions 62 of the lower legs 46 of the passenger 12. In certain embodiments, the window 114 may be an elastic surface through which the back leg bar 102 may move (e.g., similar to a lumbar adjustment in an automotive seat).

Figure 6:
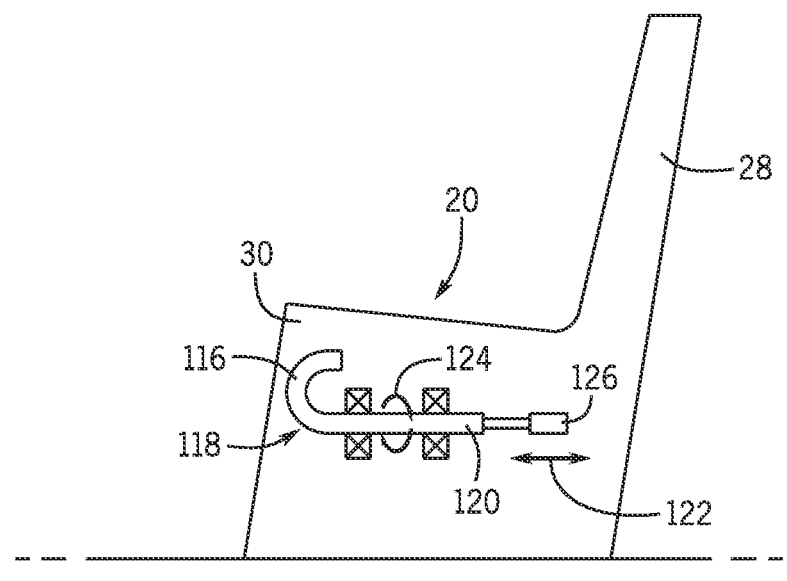
FIG. 6 is a side view of the seat and another embodiment of the lower leg restraint system of the ride vehicle of FIG. 2, in accordance with embodiments of the present disclosure.

FIG. 6 is a side view of the seat 30 and another embodiment of the lower leg restraint system 20 of the ride vehicle 14 of FIG. 2. As illustrated, in certain embodiments, the lower leg restraint system 20 may include hooks 116 disposed on opposite lateral sides of the seat 30. In certain embodiments, each hook 116 may be disposed at an axial end 118 of a rod 120 that is configured to extend forward (e.g., as illustrated by arrows 122) from a retracted position (e.g., within the seat 30), rotate approximately 90 degrees (e.g., as illustrated by arrows 124), and then retract backward slightly (e.g., as illustrated by arrows 122 as well) into a restraining position to restrain a respective lower leg 46 of a passenger 12. Then, after a ride cycle, each hook 116 and rod 120 may extend forward slightly, rotate approximately 90 degrees, and then retract backward into a stowed position to enable the passenger 12 to exit the ride vehicle 14. The 90 degree rotation described herein may be approximately 90 degrees (e.g., within 85 degrees and 95 degrees, within 865 degrees and 94 degrees, within 87 degrees and 93 degrees, within 88 degrees and 92 degrees, within 89 degrees and 91 degrees, and so forth). It will be appreciated that each hook 116 only partially surrounds the respective lower leg 46 of the passenger 12 when in the restraining position.

In certain embodiments, each hook 116 and associated rod 120 may be associated with a respective actuator 126, which may cause the associated hook 116 and rod 120 to extend forward, rotate, and then retract backward slightly into a restraining position, and then to cause the associated hook 116 and rod 120 to extend forward slightly, rotate approximately 90 degrees, and then retract backward into a stowed position, as described above. In certain embodiments, the actuator 126 may be a pneumatic actuator. However, in other embodiments, the actuator 126 may be any suitable actuator capable of actuating the respective hook 116 and rod 120 such as a hydraulic actuator, a mechanical actuator, an electric actuator, an electrohydraulic actuator, an electromechanical actuator, or other suitable actuator.

Figure 7:
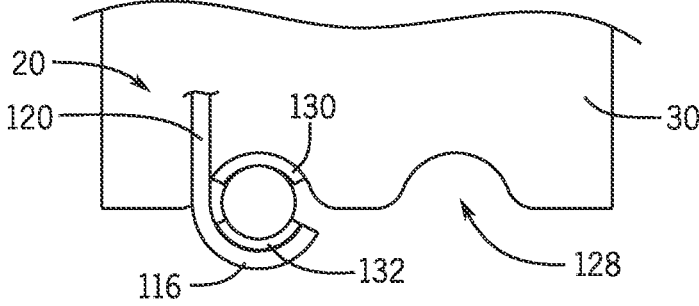
FIG. 7 is a top view of the seat and a hook of the lower leg restraint system of FIG. 6, in accordance with embodiments of the present disclosure.

FIG. 7 is a top view of the seat 30 and one of the hooks 116 of the lower leg restraint system 20 of FIG. 6. Although only one hook 116 is illustrated in FIG. 7, it will be appreciated that the lower leg restraint system 20 may include two hooks 116, one for each lower leg 46 of a passenger 12. As illustrated, in certain embodiments, the seat 30 may include indentions 128 that extend into the seat 30 that are generally shaped to receive respective lower legs 46 of a passenger 12. In addition, in certain embodiments, the indentions 128 may have seat padding 130 for comfort purposes. It will be appreciated that the indentions 128 extending into the seat 30 may be used in the other embodiments described herein (e.g., illustrated in FIGS. 3-5). In addition, in certain embodiments, the hooks 116 may also include padding 132 (e.g., on an inner surface of each hook 116) for comfort purposes.

As described in greater detail herein, in certain embodiments, a ride vehicle controller 34 of a ride vehicle 14 and/or a base station controller 42 of the control system 32 illustrated in FIG. 2 may be configured to control the various features of the restraint system 18 (e.g., including the lower leg restraint system 20) described herein. For example, in certain embodiments, the ride vehicle controller 34 and/or the base station controller 42 may send control signals to the various actuators 86, 110, 126 described herein to enable the actuators 86, 110, 126 to actuate the lower leg restraint systems 20 described herein.

In addition, in certain embodiments, the ride vehicle controller 34 and/or the base station controller 42 may send control signals to the various actuators 86, 110, 126 described herein based at least in part on feedback received from various sensors 55 integrated into the back rest 28, the seat 30, and any of the various features of the restraint system 18 (e.g., including the lower leg restraint system 20) described herein (see, e.g., FIG. 2). For example, in certain embodiments, the sensors 55 may include force or pressure sensors integrated into the back rest 28 and/or the seat 30 (e.g., including in the indentions 128 of the seat 30) that may detect that body portions of a passenger 12 are located in position relative to the seat 30 and the restraint system 18 (e.g., including the lower leg restraint system 20) such that the various features of the restraint system 18 (e.g., including the lower leg restraint system 20) may be actuated into restraining positions, as described in greater detail herein. In addition, in certain embodiments, the sensors 55 may include force or pressure sensors integrated into the various restraining features (e.g., including the front leg bars 66, the back leg bars 102, and the hooks 116 described herein) that may detect when the restraining features contact certain body portions (e.g., lower legs 46) of a passenger 12 such that the ride vehicle controller 34 and/or the base station controller 42 may stop increasing force or pressure when contact with the body portions is made. In addition, in certain embodiments, the sensors 55 may include proximity sensors integrated into the various restraining features (e.g., including the front leg bars 66, the back leg bars 102, and the hooks 116 described herein) that may determine the proximity of the restraining features relative to certain body portions (e.g., lower legs 46) of a passenger 12 such that the ride vehicle controller 34 and/or the base station controller 42 may stop increasing force or pressure when contact with the body portions is made.

As such, the embodiments described herein include various techniques for restraining portions of lower legs 46 of passengers 12 relative to seats 30 of ride vehicles 14 the passengers 12 are occupying without completely surrounding the lower legs 46 of the passengers 12 (e.g., enabling movement of the lower legs 46 in at least one lateral direction). For example, in certain embodiments, a ride vehicle 14 includes a seat 30 configured to be occupied by (or otherwise restrain) a passenger 12 of the ride vehicle 14. In addition, in certain embodiments, the ride vehicle 14 includes a lower leg restraint system 20 configured to restrain portions 60, 62 of one or more lower legs 46 of the passenger 12 relative to the seat 30 while the passenger 12 occupies the seat 30 of the ride vehicle 14.

In certain embodiments, the lower leg restraint system 20 includes a front leg restraint sub-system 56 configured to be positioned closely proximate to and resist motion of the one or more lower legs 46 of the passenger 12 when forces are applied against front portions 60 of the one or more lower legs 46 of the passenger 12. In certain embodiments, the front leg restraint sub-system 56 includes a padded front leg bar 66 configured to apply the forces against the front portions 60 of the one or more lower legs 46 of the passenger 12. In addition, in certain embodiments, the front leg restraint sub-system 56 includes one or more linkages 64 configured to rotate about a floor pivot joint 68 of the ride vehicle 14 to move the padded front leg bar 66 against the front portions 60 of the one or more lower legs 46 of the passenger 12.

In certain embodiments, the lower leg restraint system 20 includes a back leg restraint sub-system 58 configured to be positioned closely proximate to and resist motion of the one or more lower legs 46 of the passenger 12 when forces are applied against back portions 62 of the one or more lower legs 46 of the passenger 12. In certain embodiments, the back leg restraint sub-system 58 includes a padded back leg bar 102 configured to apply the forces against the back portions 62 of the one or more lower legs 46 of the passenger 12. In addition, in certain embodiments, the back leg restraint sub-system 58 includes first and second linkages 88, 100 coupled to each other at a main pivot joint 96 to move the padded back leg bar 102 against the back portions 62 of the one or more lower legs 46 of the passenger 12. In addition, in certain embodiments, the seat 30 includes a window 114 through which the padded back leg bar 102 may move to contact the back portions 62 of the one or more lower legs 46 of the passenger 12.

In certain embodiments, the lower leg restraint system 20 includes one or more hooks 116 configured to be positioned closely proximate to and resist motion of the one or more lower legs 46 of the passenger 12 when forces are applied against front portions 60 of the one or more lower legs 46 of the passenger 12. In certain embodiments, the one or more hooks 116 are configured to extend forward from a retracted position, to rotate approximately 90 degrees, and to retract backward slightly to apply the forces against the front portions 60 of the one or more lower legs 46 of the passenger 12. In certain embodiments, the one or more hooks are padded. In addition, in certain embodiments, the seat 30 includes one or more indentions 128 extending into the seat 30 that are shaped to receive the one or more lower legs 46 of the passenger 12.

In certain embodiments, the ride vehicle 14 also includes a control system 32 (e.g., a ride vehicle controller 34 and/or a base station controller 42) configured to actuate one or more actuators 86, 110, 126 of the lower leg restraint system 20 to cause one or more restraining features 66, 102, 116 of the lower leg restraint system 20 to restrain the portions 60, 62 of the one or more lower legs 46 of the passenger 12 relative to the seat 30. In addition, in certain embodiments, the ride vehicle 14 also includes one or more sensors configured to detect a force, pressure, or proximity of the one or more restraining features 66, 102, 116 relative to the portions 60, 62 of the one or more lower legs 46 of the passenger 12. The control system 32 is configured to actuate the one or more actuators 86, 110, 126 of the lower leg restraint system 20 based at least in part of the detected force, pressure, or proximity.

FIG. 8 is a flow diagram of a method 134 for utilizing the control system 32 (e.g., the ride vehicle controller 34 and/or the base station controller 42) described herein. In certain embodiments, the method 134 includes detecting, via one or more sensors 55 of a ride vehicle 14 (or other type of amusement park attraction), a force, pressure, or proximity of one or more restraining features 66, 102, 116 of a lower leg restraint system relative to portions 60, 62 of one or more lower legs 46 of a passenger 12 (or other guest) of the ride vehicle 14 (block 136). In addition, in certain embodiments, the method 134 includes actuating, via the control system 32, one or more actuators 86, 110, 126 of the lower leg restraint system 20 to cause the one or more restraining features 66, 102, 116 of the lower leg restraint system 20 to restrain the portions 60, 62 of the one or more lower legs 46 of the passenger 12 relative to a seat 30 (e.g., or other type of guest restraint device) of the ride vehicle 14 based at least in part of the detected force, pressure, or proximity (block 138).

In certain embodiments, the lower leg restraint system 20 includes a front leg restraint sub-system 56 configured to be positioned closely proximate to and resist motion of the one or more lower legs 46 of the passenger 12 when forces are applied against front portions 60 of the one or more lower legs 46 of the passenger 12. In addition, in certain embodiments, the lower leg restraint system 20 includes a back leg restraint sub-system 58 configured to be positioned closely proximate to and resist motion of the one or more lower legs 46 of the passenger 12 when forces are applied against back portions 62 of the one or more lower legs 46 of the passenger 12. In addition, in certain embodiments, the lower leg restraint system 20 includes one or more hooks 116 configured to be positioned closely proximate to and resist motion of the one or more lower legs 46 of the passenger 12 when forces are applied against front portions 60 of the one or more lower legs 46 of the passenger 12.

While only certain features of the disclosed embodiments have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. An amusement park attraction, comprising:
a guest restraint device configured to restrain a guest of the amusement park attraction; and
a lower leg restraint system configured to restrain portions of one or more lower legs of the guest relative to the guest restraint device while the guest is restrained by the guest restraint device of the amusement park attraction, wherein the lower leg restraint system only partially surrounds the one or more lower legs of the guest, wherein the lower leg restraint system comprises a front leg bar configured to apply forces against front portions of the one or more lower legs of the guest, and wherein the front leg bar is configured to move from a stowed position where the front leg bar is stowed within a storage chamber to a restraining position where the front leg bar is secured against the front portions of the one or more lower legs of the guest.

2. The amusement park attraction of claim 1, wherein the lower leg restraint system comprises a front leg restraint sub-system configured to be positioned closely proximate to and resist motion of the one or more lower legs of the guest when the forces are applied against the front portions of the one or more lower legs of the guest.

3. The amusement park attraction of claim 2, wherein the front leg bar is padded and configured to apply the forces against the front portions of the one or more lower legs of the guest.

4. The amusement park attraction of claim 3, wherein the front leg restraint sub-system comprises one or more linkages configured to rotate about a floor pivot joint of the amusement park attraction to move the front leg bar against the front portions of the one or more lower legs of the guest.

5. The amusement park attraction of claim 1, wherein the lower leg restraint system comprises a back leg restraint sub-system configured to be positioned closely proximate to and resist motion of the one or more lower legs of the guest when forces are applied against back portions of the one or more lower legs of the guest.

6. The amusement park attraction of claim 5, wherein the back leg restraint sub-system comprises a back leg bar that is padded and configured to apply the forces against the back portions of the one or more lower legs of the guest.

7. The amusement park attraction of claim 6, wherein the back leg restraint sub-system comprises a plurality of linkages coupled to each other by at least one pivot joint to move the back leg bar against the back portions of the one or more lower legs of the guest.

8. The amusement park attraction of claim 6, wherein the guest restraint device comprises a window through which the back leg bar may move to contact the back portions of the one or more lower legs of the guest.

9. The amusement park attraction of claim 1, comprising a control system configured to actuate one or more actuators of the lower leg restraint system to cause one or more restraining features of the lower leg restraint system to restrain the portions of the one or more lower legs of the guest relative to the guest restraint device.

10. The amusement park attraction of claim 9, comprising one or more sensors configured to detect force, pressure, or proximity of the one or more restraining features relative to the portions of the one or more lower legs of the guest, wherein the control system is configured to actuate the one or more actuators of the lower leg restraint system based at least in part on the detected force, pressure, or proximity.

11. An amusement park attraction, comprising:
a guest restraint device configured to restrain a guest of the amusement park attraction; and
a lower leg restraint system configured to restrain portions of one or more lower legs of the guest relative to the guest restraint device while the guest is restrained by the guest restraint device of the amusement park attraction, wherein the lower leg restraint system comprises:
a front leg restraint sub-system comprising a padded front leg bar configured to be positioned closely proximate to and resist motion of the one or more lower legs of the guest when forces are applied against front portions of the one or more lower legs of the guest, wherein the front leg restraint sub-system comprises one or more linkages configured to rotate about a floor pivot joint of the amusement park attraction to move the padded front leg bar against the front portions of the one or more lower legs of the guest; and a back leg restraint sub-system comprising a padded back leg bar configured to be positioned closely proximate to and resist motion of the one or more lower legs of the guest when forces are applied against back portions of the one or more lower legs of the guest.

12. The amusement park attraction of claim 11, wherein the back leg restraint sub-system comprises a plurality of linkages coupled to each other by at least one pivot joint to move the padded back leg bar against the back portions of the one or more lower legs of the guest.

13. The amusement park attraction of claim 11, wherein the guest restraint device comprises a window through which the padded back leg bar may move to contact the back portions of the one or more lower legs of the guest.

14. The amusement park attraction of claim 11, comprising a control system configured to actuate one or more actuators of the lower leg restraint system to cause one or more restraining features of the lower leg restraint system to restrain the portions of the one or more lower legs of the guest relative to the guest restraint device.

15. The amusement park attraction of claim 14, comprising one or more sensors configured to detect force, pressure, or proximity of the one or more restraining features relative to the portions of the one or more lower legs of the guest, wherein the control system is configured to actuate the one or more actuators of the lower leg restraint system based at least in part on the detected force, pressure, or proximity.

16. The amusement park attraction of claim 11, wherein the one or more linkages are configured to move the padded front leg bar from a stowed position where the padded front leg bar is stowed within a storage chamber to a restraining position where the padded front leg bar is secured against the front portions of the one or more lower legs of the guest.

17. The amusement park attraction of claim 11, wherein the lower leg restraint system only partially surrounds the one or more lower legs of the guest.

* * * * *